United States Patent [19]

Harada et al.

[11] 4,367,278

[45] Jan. 4, 1983

[54] COLOR PHOTOGRAPHIC LIGHT-SENSITIVE MATERIAL WITH AZOPYRAZOLONE IMAGE DYES

[75] Inventors: Tooru Harada; Yasuhiro Noguchi, both of Minami-ashigara, Japan

[73] Assignee: Fuji Photo Film Co., Ltd., Kanagawa, Japan

[21] Appl. No.: 261,079

[22] Filed: May 6, 1981

[30] Foreign Application Priority Data

May 6, 1980 [JP] Japan ................................. 55-59651

[51] Int. Cl.³ .......................... G03C 1/40; G03C 1/10; G03C 5/54
[52] U.S. Cl. .................................... 430/223; 430/222; 430/226; 430/562
[58] Field of Search ............... 430/222, 223, 225, 226, 430/562

[56] References Cited

U.S. PATENT DOCUMENTS

| | | | |
|---|---|---|---|
| 3,222,169 | 12/1965 | Green et al. | 430/562 |
| 3,230,085 | 1/1966 | Dershowitz et al. | 430/225 |
| 3,309,199 | 3/1967 | Ross | 430/225 |
| 4,013,633 | 3/1977 | Haase et al. | 430/223 |
| 4,245,028 | 1/1981 | Fujita et al. | 430/223 |

OTHER PUBLICATIONS

Bailey et al., "Metallezable Dyes for Diffusion Transfer Photography", *Research Disclosure*, No. 17334, 9/1978, pp. 76–85.

*Primary Examiner*—Richard L. Schilling
*Attorney, Agent, or Firm*—Sughrue, Mion, Zinn, Macpeak, and Seas

[57] ABSTRACT

A color photographic light-sensitive material comprising a support having thereon at least one light-sensitive silver halide emulsion layer having associated therewith a compound encompassed by one of two general formulae which are specifically disclosed. The compound associated with the silver halide emulsion layer is an azo dye image-forming compound which provides a yellow dye image having excellent transferability and light fastness. The azo dye image forming compound is particularly suitable for use in a photographic material for a color diffusion transfer process. The disclosed material is capable of providing a transferred dye image with a high maximum image density ($D_{max}$), a low minimum background density ($D_{min}$), a good gradation and excellent color hue.

15 Claims, No Drawings

COLOR PHOTOGRAPHIC LIGHT-SENSITIVE MATERIAL WITH AZOPYRAZOLONE IMAGE DYES

FIELD OF THE INVENTION

The present invention relates to a color photographic light-sensitive material and, more particularly, to a silver halide photographic light-sensitive material for a color diffusion transfer process which contains a novel yellow dye image-forming compound.

BACKGROUND OF THE INVENTION

In a color diffusion transfer process a color image is formed by utilizing a difference in diffusibility between a dye image-forming compound and a dye compound (which forms a color image in an image-receiving layer) derived from the dye image-forming compound. Typical examples of the dye image-forming compounds include dye developers, dye releasing couplers (DDR couplers) and dye-releasing redox compounds (DRR compounds) as described, for example, in *Photographic Science and Engineering*, Vol. 20, No. 4, pages 155 to 164 (July/August, 1976), T. H. James, *The Theory of the Photographic Process*, Fourth Edition, pages 366 to 372, Macmillan Publishing Co., Inc., New York (1977). Yellow dye-releasing redox compounds include azopyrazolone type yellow dye developers and yellow dye-releasing redox compounds having an aryl group at the 1-position of the pyrazolone nucleus as described, for example, in U.S. Pat. Nos. 3,309,199 and 4,013,633, U.S. Published Application (USB) No. 351,673. However, the dyes formed from the compounds specifically described in these patents have technical problems including a low transfer speed and inadequate light fastness. Although improved yellow dye-releasing redox compounds are described in Japanese Patent Application (OPI) No. 149328/78 (the term "OPI" as used herein refers to a "published unexamined Japanese patent application"), further improvements have been desired.

SUMMARY OF THE INVENTION

An object of the present invention is to provide a photographic light-sensitive material for a color diffusion transfer process containing a compound forming a yellow dye (image) which has a high transfer speed and an excellent light fastness.

The inventors have conducted various investigations and discovered that the above-described object can be effectively attained and that satisfactory photographic characteristics are obtained by using in a color photographic light-sensitive material, an azo dye image-forming compound represented by the following general formula (I) or (II):

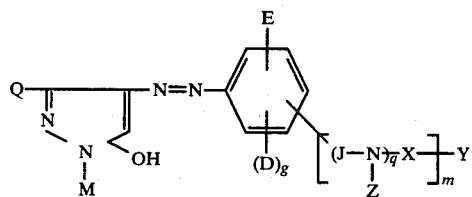

(I)

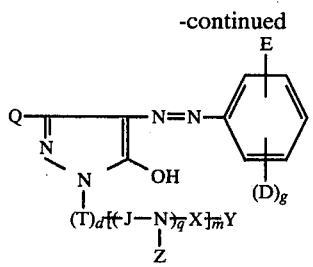

(II)

wherein Q represents a cyano group, a trifluoromethyl group or a carbamoyl group represented by the formula $-CONR^1R^2$ (wherein $R^1$ represents a hydrogen atom, an alkyl group or a substituted alkyl group, $R^2$ represents a hydrogen atom, an alkyl group, a substituted alkyl group, an aralkyl group or an aryl group, and $R^1$ and $R^2$ may combine directly or through an oxygen atom to form a ring); M represents a hydrogen atom, an alkyl group, a substituted alkyl group, a group represented by the formula $-COOR^3$ (wherein $R^3$ represents a hydrogen atom, an alkyl group, a substituted alkyl group, a phenyl group or a substituted phenyl group), a group represented by the formula $-COR^3$ (wherein $R^3$ has the same meaning as defined above), a group represented by the formula $-CONR^1R^2$ (wherein $R^1$ and $R^2$ each has the same meaning as defined above) or a group represented by the formula $-SO_2R^4$ (wherein $R^4$ represents an alkyl group, a substituted alkyl group, a phenyl group or a substituted phenyl group); E represents a hydrogen atom, a halogen atom, an alkyl group, a substituted alkyl group, a hydroxy group, an alkoxy group or a substituted alkoxy group; D represents a substituent defined for E or an electron attractive group selected from a cyano group, a trifluoromethyl group, a group represented by the formula $-SO_2R^4$ (wherein $R^4$ has the same meaning as define above), a group represented by the formula $-COOR^3$ (wherein $R^3$ has the same meaning as defined above), a group represented by the formula $-CONR^1R^2$ (wherein $R^1$ and $R^2$ each has the same meaning as defined above), a sulfo group and a group represented by the formula $-SO_2NR^1R^2$ (wherein $R^1$ and $R^2$ each has the same meaning as defined above); g represents 0, 1 or 2; T represents an alkylene group or a substituted alkylene group; d represents 0 or 1; m and q each represents 0 or 1; J represents a divalent group selected from a sulfonyl group and a carbonyl group; Z represents a hydrogen atom, an alkyl group or a substituted alkyl group; X represents a divalent bonding group represented by the formula $-A_1-(L)_n-(A_2)_p-$ (wherein $A_1$ and $A_2$ are the same or different and each represents an alkylene group or an arylene group, L represents a divalent group selected from an oxy group, a carbonyl group, a carboxyamido group, a carbamoyl group, a sulfonamido group, a sulfamoyl group, a sulfinyl group and a sulfonyl group, and n and p each represents 0 or 1); and Y represents a moiety which provides, as a result of development processing under alkaline conditions, an azo dye compound having a different diffusibility from that of the azo dye image-forming compound of the formula (I) or (II).

DETAILED DESCRIPTION OF THE INVENTION

In addition to the above-described effects, the following effects can also be obtained according to the present invention:

(i) maximum transferred image density ($D_{max}$) is high, (ii) color hue of dye image is excellent, and (iii) pH dependency of color hue of dye image is small.

The compounds used in the present invention are characterized by the presence of the group represented by M in the dye moiety (specifically at the 1-position of the pyrazolone nucleus) in the dyes represented by the general formula (I) and the presence of the group represented by $(T)_d$ at the 1-position of the pyrazolone nucleus in the dyes represented by the general formula (II). The above-described superior effects of the present invention are based on these groups and are completely unexpected in view of compounds described in Japanese Patent Application (OPI) No. 149328/78 and compounds in which a phenyl group or a substituted phenyl group is bonded at the 1-position of the pyrazolone nucleus.

Of the groups represented by M, the alkyl group or the alkyl moiety in the substituted alkyl group preferably has 1 to 14 carbon atoms (more preferably 1 to 4 carbon atoms) and may be a straight chain, branched chain or cyclic alkyl group. Examples of suitable substituents for the substituted alkyl group include a cyano group, an alkoxy group (which may be substituted with a halogen atom, etc.), a hydroxy group, a carboxy group, a carbamoyl group (which may be substituted with an alkyl group, etc.), a sulfo group, a sulfamoyl group (which may be substituted with an alkyl group, etc.), a halogen atom, a phenyl group, a substituted phenyl group, an amino group (which may be substituted with an alkyl group, an aryl group, etc.), and the like.

Examples of suitable substituents for the substituted phenyl group in M are same as the substituents for the substituted phenyl group in $R^2$ to $R^4$ described hereinafter.

In the —COOR$^3$ group, $R^3$ preferably represents an alkyl group having 1 to 8 carbon atoms (more preferably 1 to 4 carbon atoms), a substituted alkyl group having 1 to 8 carbon atoms (more preferably 1 to 4 carbon atoms) in the alkyl moiety, a phenyl group or a substituted phenyl group having 6 to 9 carbon atoms.

In the carbamoyl group represented by the formula —CONR$^1$R$^2$, $R^1$ is preferably a hydrogen atom, an alkyl group having 1 to 8 carbon atoms (more preferably 1 to 4 carbon atoms) or a substituted alkyl group having 1 to 8 carbon atoms (more preferably 1 to 4 carbon atoms) in the alkyl moiety and $R^2$ is preferably a hydrogen atom, an alkyl group having 1 to 8 carbon atoms (more preferably 1 to 4 carbon atoms), a substituted alkyl group having 1 to 8 carbon atoms (more preferably 1 to 4 carbon atoms) in the alkyl moiety, a benzyl group, a phenyl group or a substituted phenyl group having 6 to 9 carbon atoms. Also, $R^1$ and $R^2$ may be combined directly or through an oxygen atom to form a 5- or 6-membered ring. The cases where: (1) $R^1$ and $R^2$ each represents a hydrogen atom and (2) one of $R^1$ and $R^2$ represents a hydrogen atom and the other of $R^1$ and $R^2$ represents an alkyl group having 1 to 4 carbon atoms, are particularly preferred because of the easy availability of the dye compound formed and excellent high transfer speed.

In the sulfonyl group represented by the formula —SO$_2$R$^4$, $R^4$ is preferably an alkyl group having 1 to 8 carbon atoms (more preferably 1 to 4 carbon atoms), a substituted alkyl group having 1 to 8 carbon atoms (more preferably 1 to 4 carbon atoms) in the alkyl moiety, a phenyl group or a substituted phenyl group having 6 to 9 carbon atoms.

Examples of suitable substituents which can be present in the above-described substituted alkyl groups represented by $R^1$ to $R^4$ include one or more of a cyano group, an alkoxy group (which may be substituted with a halogen atom, etc.), a hydroxy group, a carboxy group, a sulfo group, a halogen atom, and the like. Further, examples of suitable substituents which can be present in the above-described substituted phenyl group represented by $R^2$ to $R^4$ include one or more of a hydroxy group, a halogen atom, a carboxy group, a carbamoyl group, a sulfo group, a sulfamoyl group (which may be substituted with an alkyl group, etc.), and the like.

The alkylene group or the substituted alkylene group represented by T is preferably those having 1 to 14 carbon atoms (more preferably 2 to 4 carbon atoms) in the alkylene moiety. Examples of suitable substituents which can be present in the substituted alkylene group include an alkoxy group (which may be substituted with a halogen atom, etc.), a halogen atom, and the like.

The —CONR$^1$R$^2$ group represented by Q has the same meaning as defined above.

It is particularly preferred for Q to be a cyano group in view of the excellent light fastness of the transferred dye images.

The alkyl group represented by E can be a straight chain or branched chain alkyl group and preferably is an alkyl group having 1 to 8 carbon atoms, more preferably an alkyl group having 1 to 4 carbon atoms (for example, a methyl group, an ethyl group, an n-propyl group, an isopropyl group, an n-butyl group, etc.).

The substituted alkyl group represented by E is preferably a substituted alkyl group having 1 to 8 carbon atoms in the alkyl moiety, and more preferably a substituted alkyl group having 1 to 4 carbon atoms in the alkyl moiety. Examples of suitable substituents which can be present in the substituted alkyl group include a cyano group, an alkoxy group (which can be substituted with a halogen atom, etc.), a hydroxy group, a carboxy group, a sulfo group, and the like.

The alkylsulfonyl group or the substituted alkylsulfonyl group represented by D is preferably those having 1 to about 8 carbon atoms in the alkyl moiety. Examples of suitable substituents which can be present in the substituted alkylsulfonyl group include a hydroxy group, a phenyl group, a cyano group, a sulfamoyl group (which may be substituted with an alkyl group, etc.), a carboxy group, a fluorosulfonyl group, a sulfo group, and the like.

Examples of suitable substituents which can be present in the substituted phenylsulfonyl group represented by D include a carboxy group, a hydroxy group, an alkoxy group (which may be substituted with a halogen atom, etc.), a sulfamoyl group (which may be substituted with an alkyl group, etc.), a fluorosulfonyl group, a sulfo group, and the like.

The —COOR$^3$ group, the —CONR$^1$R$^2$ group and the —SO$_2$NR$^1$R$^2$ group represented by D are same as those described in greater detail with respect to M above.

Compounds represented by the general formula (I) or (II) include non-diffusible image-forming materials (DRR compounds) which provide a diffusible dye as a result of self cleavage due to oxidation by the development processing. Examples of Y which are effective for this type of compound are the group represented by the following formula (A):

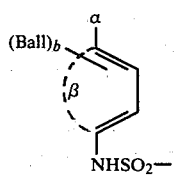

(A)

In the above formula, β represents non-metallic atoms necessary to complete a benzene ring, to which a carbon ring or a hetero ring may be fused to form, for example, a naphthalene ring, a quinoline ring, a 5,6,7,8-tetrahydronaphthalene ring, a chroman ring, etc. Further, said benzene ring or said ring wherein a carbon ring or hetero ring is fused to the benzene ring may have a substituent or substituents such as a halogen atom, an alkyl group, an alkoxy group, an aryl group, an aryloxy group, a nitro group, an amino group, an alkylamino group, an arylamino group, an amido group, a cyano group, an alkylmercapto group, a keto group, a carboalkoxy group, a hetero ring group, etc.

α represents an —$OG^1$ or —$NHG^2$ group, wherein $G^1$ represents a hydrogen atom or a group capable of forming a hydroxyl group by hydrolysis, and preferably represents

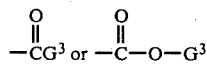

wherein $G^3$ represents an alkyl group, in particular, an alkyl group having 1 to 18 carbon atoms (such as a methyl group, an ethyl group, a propyl group, etc.), a halogen-substituted alkyl group having 1 to 18 carbon atoms (such as a chloromethyl group, a trifluoromethyl group, etc.), a phenyl group or a substituted phenyl group, and $G^2$ represents a hydrogen atom, an alkyl group having 1 to 22 carbon atoms or a hydrolyzable group. Preferable examples of said hydrolyzable group represented by $G^2$ are

—$SO_2G^5$ or —$SOG^5$, wherein $G^4$ represents an alkyl group having 1 to 4 carbon atoms (such as a methyl group); a halogen-substituted alkyl group (such as mono-, di- or trichloromethyl group or a trifluoromethyl group); an alkylcarbonyl group (such as an acetyl group); an alkoxy group; a substituted phenyl group (such as a nitrophenyl group or a cyanophenyl group); a phenyloxy group unsubstituted or substituted by a lower alkyl group or a halogen atom; a carboxyl group; an alkyloxycarbonyl group; an aryloxycarbonyl group; an alkylsulfonylethoxy group; or an arylsulfonylethoxy group, and $G^5$ represents a substituted or unsubstituted alkyl or aryl group.

Further, b is an integer of 0, 1 or 2, and b represents 1 or 2, preferably 1, when α represents a group represented by —$OG^1$ or —$NHG^2$ wherein $G^2$ represents a hydrogen atom, an alkyl group having 1 to 8 carbon atoms or a hydrolyzable group.

Ball represents a ballast group which will be described in detail hereinafter.

Specific examples of this type Y are described in U.S. Pat. Nos. 3,928,312 and 4,135,929 and Japanese Patent Application (OPI) No. 50736/78.

As the another examples of Y suitable for this type of compounds, there are illustrated the group represented by the following formula (B):

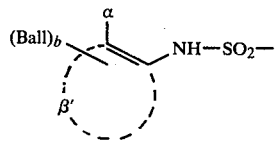

(B)

In the above formula, Ball, α and b are the same as defined in formula (A), β' represents the atoms necessary to form a carbon ring, for example, a benzene ring, to which a carbon ring or a hetero ring may further be fused to form a naphthalene ring, a quinoline ring, a 5,6,7,8-tetrahydronaphthalene ring, a chroman ring, etc. The above-described various rings may be further substituted by a halogen atom, an alkyl group, an alkoxy group, an aryl group, an aryloxy group, a nitro group, an amino group, an alkylamino group, an arylamino group, an amido group, a cyano group, an alkylmercapto group, a keto group, a carboalkoxy group, a hetero ring or the like. Specific examples of this type Y are described in U.S. Pat. Nos. 4,055,428 and 4,053,312, Japanese Patent Application (OPI) Nos. 149328/78, 12642/81, 16130/81 and 16131/81. Furthermore, the group represented by the following general formula is suitable.

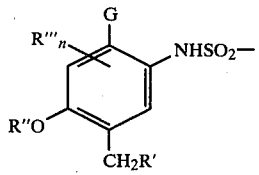

In the above formula, G represents a hydroxy group or a group capable of forming a hydroxy group by hydrolysis; R' represents an alkyl group or an aryl group; R" represents an alkyl group or an aryl group; R'" represents an alkyl group, an alkoxy group, an alkylthio group, an arylthio group, a halogen atom or an acylamino group; n represents 0, 1 or 2; R" and R'" may be bonded each other to form a fused ring; R' and R" may be bonded each other to form a fused ring; R' and R'" may be bonded each other to form a fused ring; and the total number of carbon atoms contained in R', R" and $R_n$'" is greater than 7.

As the further examples of Y suitable for this type compounds, there are illustrated the group represented by general formula (C):

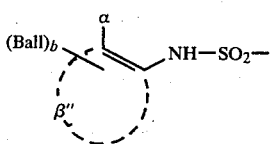

(C)

In the above formula, Ball, α and b are the same as defined in formula (A), and β" represents atoms necessary to form a hetero ring such as a pyrazole ring, a pyridine ring, etc., to which a carbon ring or a hetero ring may further be fused. The above-described rings may be substituted by the same substituents as those for the rings described in formula (B). Specific examples of this type Y are described in Japanese Patent Application (OPI) No. 104343/76.

As still further examples of Y suitable for this type compounds, there are illustrated those represented by general formula (D):

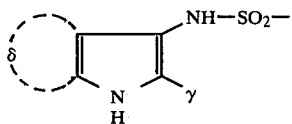

In the above formula, γ preferably represents a hydrogen atom; an alkyl group, aryl group or hetero ring group which may be unsubstituted or substituted; or —CO—$G^6$ wherein $G^6$ represents —$OG^7$, —S—$G^7$ or

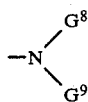

(wherein $G^7$ represents a hydrogen atom, an alkyl group, a cycloalkyl group or an aryl group, which may be substituted, $G^8$ represents the same group as $G^7$ or an acyl group derived from an aliphatic or aromatic carboxylic acid or from sulfonic acid, and $G^9$ represents a hydrogen atom or a substituted or unsubstituted alkyl group), δ represents the atoms necessary for completing a fused benzene ring which ring may have one or more substituents, and γ and/or the substituents on said fused benzene ring completed by δ is a ballast group or a ballast-containing group. Specific examples of this type Y are described in Japanese Patent Application (OPI) Nos. 46730/78 and 130122/79 and U.S. Pat. No. 4,198,235.

As still further examples of Y suitable for this type compounds, there are illustrated the group represented by general formula (E):

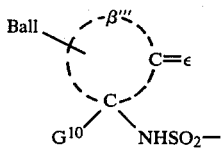

In the above formula, Ball is the same as defined in formula (A), ε represents an oxygen atom or =NG″ (G″ represents a hydroxyl group or an amino group which may be substituted) and, when ε represents =NG″, a typical example of G″ is that in =C=N—G″ formed by the dehydration reaction between a carbonyl reagent of H₂N—G″ and a ketone group. Examples of the compound of H₂N—G″ are hydroxylamines, hydrazines, semicarbazides, thiosemicarbazides, etc. Specific examples include, as the hydrazines, hydrazine, phenylhydrazine, substituted phenylhydrazine having in the phenyl moiety a substitutent or substituents such as an alkyl group, an alkoxy group, a carboalkoxy group, a halogen atom, etc., isonicotinic acid hydrazine, etc. As the semicarbazides, there are illustrated, phenylsemicarbazide or substituted phenylsemicarbazide substituted by an alkyl group, an alkoxy group, a carboalkoxy group, a halogen atom, etc. As the thiosemicarbazides, there are illustrated the same derivatives as with semicarbazides.

β‴ in the formula represents a 5-, 6- or 7-membered saturated or unsaturated non-aromatic hydrocarbons. Specific examples include cyclopentanone, cyclohexanone, cyclohexenone, cyclopentenone, cycloheptanone, cycloheptenone, etc.

These 5- to 7-membered non-aromatic hydrocarbon rings may be fused to other rings at a suitable position to form a fused ring system. As the other ring, various rings may be used regardless of whether they show aromaticity or not or whether they are hydrocarbon rings or hetero rings. However, in the case of a fused ring being formed, fused systems wherein benzene and the above-described 5- to 7-membered non-aromatic hydrocarbon ring are fused to each other such as indanone, benzcyclohexenone, benzcycloheptenone, etc., are preferable in the present invention.

The above-described 5- to 7-membered non-aromatic hydrocarbon rings or the above-described fused rings may have one or more substituents such as an alkyl group, an aryl group, an alkoxy group, an aryloxy group, an alkylcarbonyl group, an arylcarbonyl group, an alkylsulfonyl group, an arylsulfonyl group, a halogen atom, a nitro group, an amino group, an alkylamino group, an arylamino group, an amido group, an alkylamido group, an arylamido group, a cyano group, an alkylmercapto group, an alkyloxycarbonyl group, etc.

$G^{10}$ represents a hydrogen atom, or a halogen atom such as fluorine, chlorine or bromine.

Specific examples of this type Y are described in U.S. Pat. No. 4,149,892.

As the still further examples of Y for the compounds of the present invention, there are those described in, for example, U.S. Pat. Nos. 3,443,939, 3,443,940, 3,628,952, 3,844,785 and 3,443,943.

As the different type compounds represented by the general formula (I), there are illustrated non-diffusible dye image-forming compounds (DRR compounds) which release a diffusible dye under alkaline condition through self cyclization or the like but, when reacted with the oxidation product of developing agent, which do not substantially release the dye.

As the examples of Y effective for this type compounds, there are illustrated those represented by formula (F):

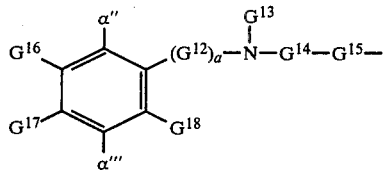

In the above formula, α″ represents an oxidizable nucleophilic group such as a hydroxyl group, a primary or secondary amino group, a hydroxyamino group or a sulfonamido group, or the precursor thereof, and preferably represents a hydroxyl group.

α‴ represents a dialkylamino group or any of those defined for α″, preferably a hydroxyl group. $G^{14}$ represents an electrophilic group such as —CO—, —CS—, etc., preferably —CO—. $G^{15}$ represents an oxygen atom, a sulfur atom, a selenium atom, a nitrogen atom, etc., and, when $G^{15}$ represents a nitrogen atom, it may be substituted by a hydrogen atom, an unsubstituted or substituted alkyl group having 1 to 10 carbon atoms, or an aromatic compound residue having 6 to 20 carbon atoms. Preferable $G^{15}$ is an oxygen atom. $G^{12}$ represents an alkylene group containing 1 to 3 carbon atoms, and a represents 0 or 1, preferably 0. $G^{13}$ is a substituted or unsubstituted alkyl group containing 1 to 40 carbon atoms or a substituted or unsubstituted aryl group containing 6 to 40 carbon atoms, preferably an alkyl group. $G^{16}$, $G^{17}$ and $G^{18}$ each represents a hydrogen atom, a halogen atom, a carbonyl group, a sulfamyl group, a sulfonamido group, an alkoxy group containing 1 to 40 carbon atoms, or the same as defined for $G^{13}$ or, when taken together, $G^{16}$ and $G^{17}$ may form a 5- to 7-membered ring. Also, $G^{17}$ may be

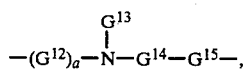

provided that at least one of $G^{13}$, $G^{16}$, $G^{17}$ and $G^{18}$ represents a ballast group.

Specific examples of this type Y are described in U.S. Pat. No. 3,980,479.

As the examples of Y suitable for this type compounds, there are further illustrated the group represented by general formula (G):

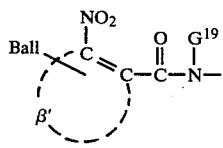

wherein Ball and $\beta'$ are the same as defined in formula (B), and $G^{19}$ represents an alkyl group (including substituted alkyl group). Specific examples of this type Y are described in Japanese Patent Application (OPI) No. 35533/78.

As the examples of Y suitable for this type compounds, there are further illustrated the group represented by general formula (H):

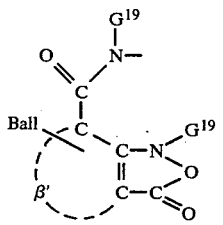

wherein Ball and $\beta'$ are the same as defined in formula (B), and $G^{19}$ is the same as defined in formula (G). Specific examples of this type Y are described in U.S. Pat. Nos. 4,199,354 and 4,199,355.

As the different type compounds represented by the general formula (I), there are illustrated non-diffusible compounds (dye-releasing couplers) which release a diffusible dye upon coupling reaction with an oxidation product of a color developing agent oxidized by silver halide. As the examples of Y effective for such compounds, the groups described in U.S. Pat. No. 3,227,550 are typical. For example, there are illustrated as Y those represented by the following general formula (J):

(Ball-Coup)$_t$-Link-  (J)

wherein Coup represents a coupler residue capable of coupling with an oxidation product of a color developing agent, for example, a 5-pyrazolone type coupler residue, a phenol type coupler residue, a naphthol type coupler residue, an indanone type coupler residue or an open chain ketomethylene coupler residue. Ball represents a ballast group. Link represents a group bonded to an active site of Coup moiety, which bond with Coup moiety will be split upon coupling reaction between the dye image-forming compound represented by formula (I) containing the group represented by formula (J) as Y and an oxidation product of a color developing agent. Examples of the Link are an azo group, an azoxy group, —O—, —Hg—, an alkylidene group, —S—, —S—S— or —NHSO$_2$—, and t represents 1 or 2 when Link represents an alkylidene group or represents 1 when Link represents the other groups described above.

The preferable Y groups represented by formula (J) are those wherein Coup represents a phenol type coupler residue, a naphthol type coupler residue or an indanone type coupler residue, and Link represents —NHSO$_2$—.

As the still different type compounds represented by the general formula (I), there are illustrated the compounds (dye developing agent) which are initially diffusible under alkaline conditions but, when oxidized through development processing, become non-diffusible. Typical examples of Y groups effective for such compounds are described in U.S. Pat. No. 2,983,606.

Other specific examples are also described in detail in S. M. Bloom, M. Green, N. Idelson and M. S. Simon, *The Chemistry of Synthetic Dyes*, Vol. 8, Edited by K. Venkataraman, Academic Press, New York (1978), pages 331 to 387.

Of the above-described groups, effective groups for Y are N-substituted sulfamoyl groups. Desirable N-substituents for the N-substituted sulfamoyl groups include carbon ring groups or hetero ring groups. Particularly preferable examples of N-carbon ring substituted sulfamoyl groups include those represented by formulae (A) and (B). Particularly preferable examples of N-hetero ring substituted sulfamoyl groups include those represented by formulae (C) and (D).

The ballast group is a group which is bonded to the compound according to the present invention in order to render the compound as a diffusion resistant compound in a hydrophilic colloid which is conventionally used in a photographic material. The group used for this purpose is preferably an organic residue having 8 to 32 carbon atoms. The organic residue is generally a group containing a straight chain or branched chain aliphatic residue, but may be a group containing a carbocyclic group, a heterocyclic group or an aromatic group. The ballast group can be bonded to the compound of the present invention directly or indirectly. If it is indirectly bonded, the ballast group is bonded through a linking group as follows: —NHCO—, —NHSO$_2$—, —CONR— (wherein R represents a hydrogen atom, an aryl group or an alkyl group), —O—, —S— or —SO$_2$—.

The diffusibility (or diffusion resistant property) is influenced by molecular size of the compound. Therefore, if the compound has a fairly large molecular size, a relatively short group may be used as the ballast group.

Of the azo dye image-forming compounds of the present invention, DRR compounds are particularly preferred.

More preferred compounds according to the present invention are the compounds represented by the above-described general formula (I) wherein M represents a straight chain or branched chain alkyl group having 1 to 14 carbon atoms (more preferably 1 to 4 carbon atoms) or a substituted alkyl group substituted with a cyano group or a sulfamoyl group; Q represents a cyano group; E represents a hydrogen atom, a chlorine atom, a bromine atom, a lower alkyl group or a lower alkoxy group; D represents a substituent defined for E, an alkylsulfonyl group having 1 to 4 carbon atoms or a sulfamoyl group (which may be substituted with an alkyl group, etc.); and Y represents a group represented by the general formula (A), (B), (C), (D), (E), (F), (G), (H) or (J) [more preferably a group represented by the general formula (A) wherein Ball is a disubstituted carbamoyl group and the substituents are long chain alkyl groups, a group represented by the general formula (B) wherein the group is represented by the following general formula:

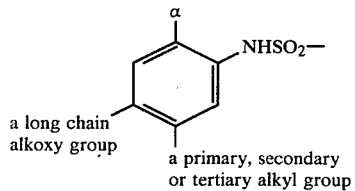

wherein α has the same meaning as defined in (B), or a group represented by the general formula (D) wherein δ is —COG$^6$].

Specific examples of the compounds according to the present invention are set forth below, but the present invention is not to be construed as being limited thereto.

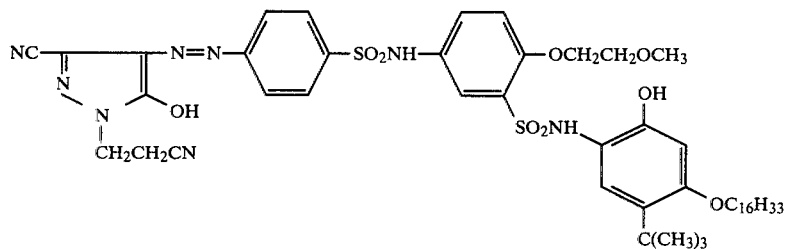

Compound 1

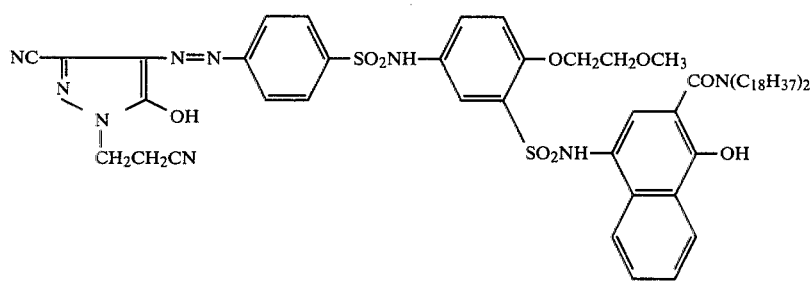

Compound 2

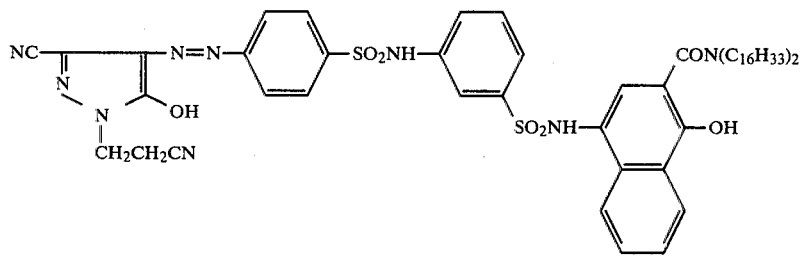

Compound 3

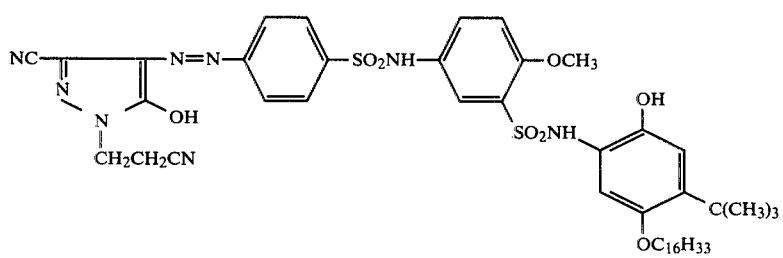

Compound 4

-continued
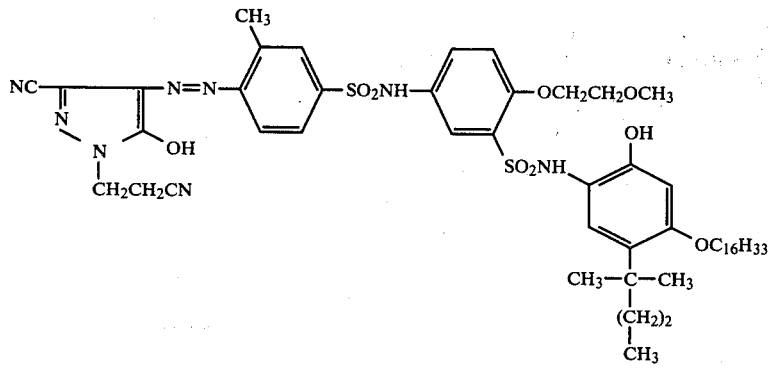
Compound 5
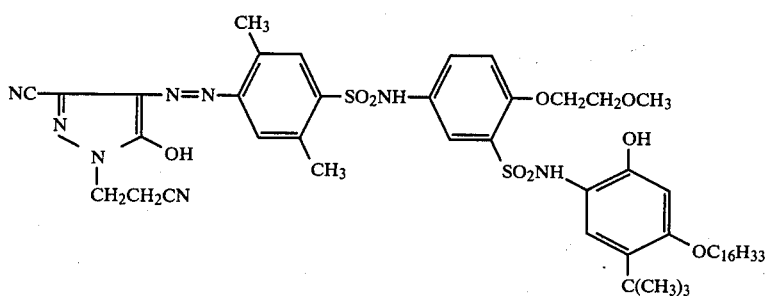
Compound 6
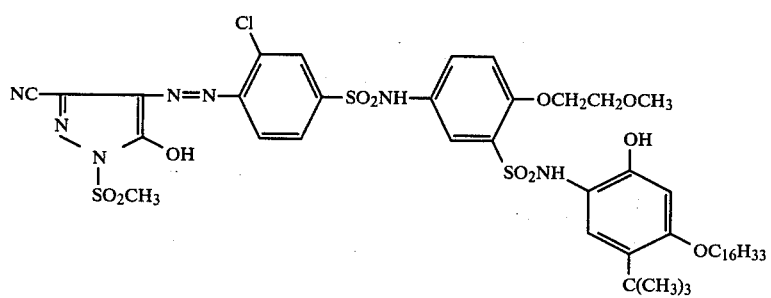
Compound 7
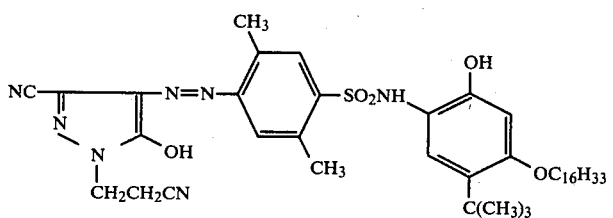
Compound 8
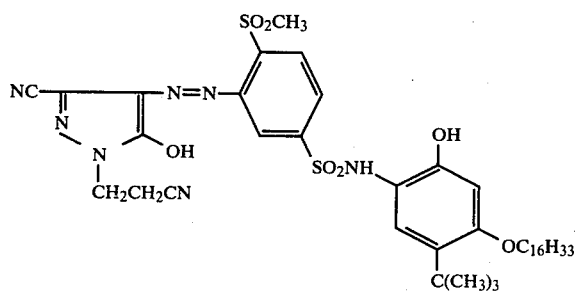
Compound 9

-continued
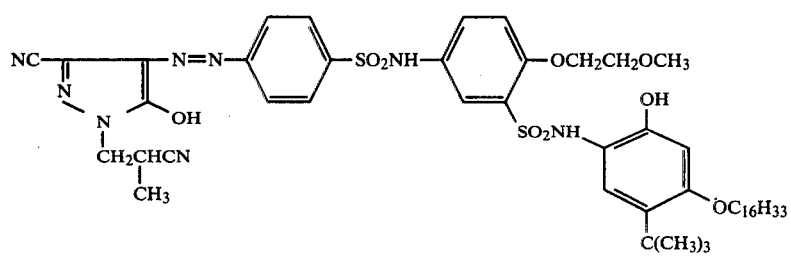
Compound 10
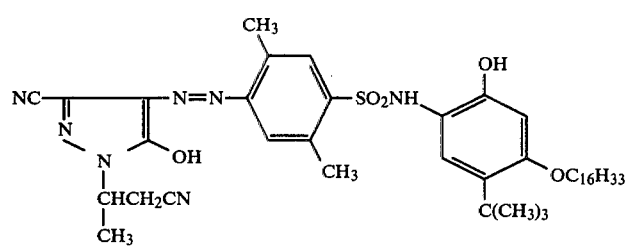
Compound 11
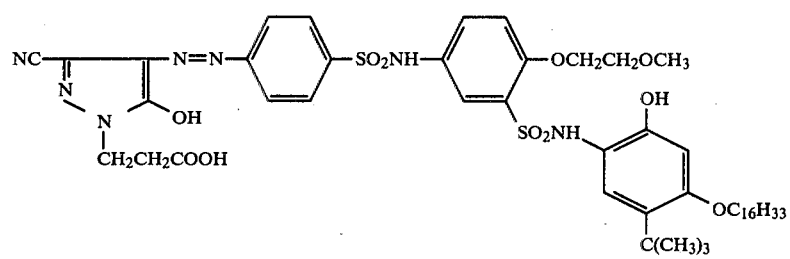
Compound 12
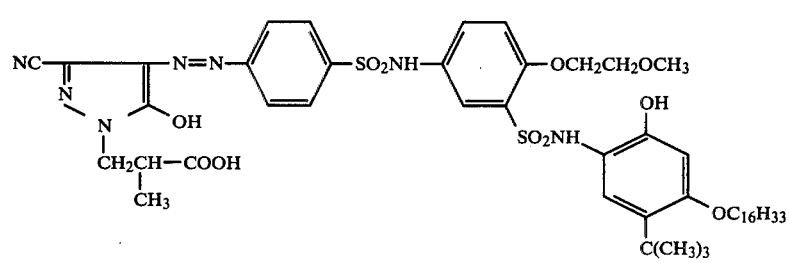
Compound 13
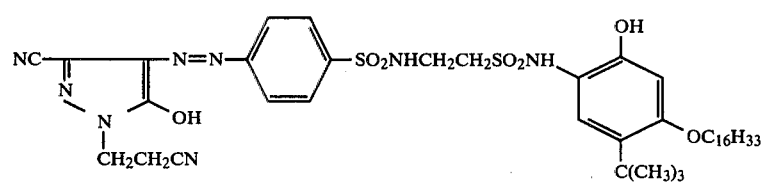
Compound 14
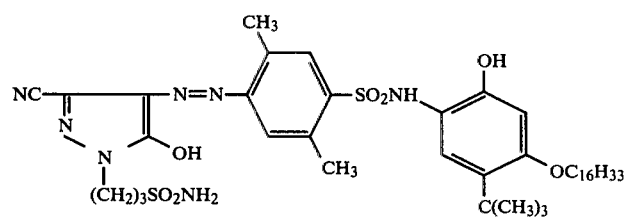
Compound 15

-continued

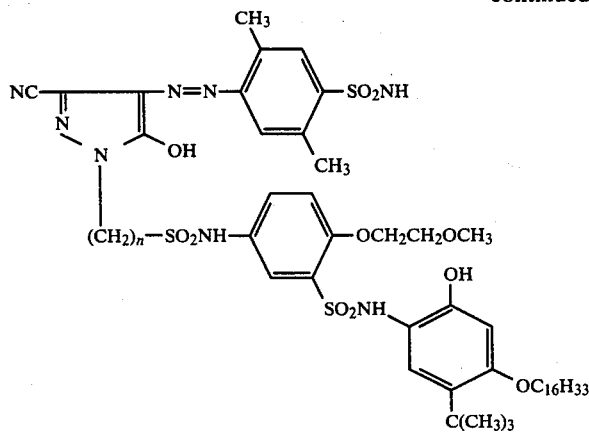

(wherein n is 2)

Compound 17
A compound having the formula same as that of Compound 16 except for n is 3.

EXAMPLE 18

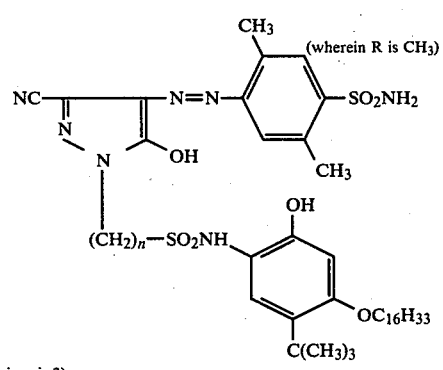

(wherein n is 2)

Compound 16

Compound 19
A compound having the formula same as that of Compound 18 except for n is 3.

Compound 20
A compound having the formula same as that of Compound 18 except for n is 4.

Compound 21

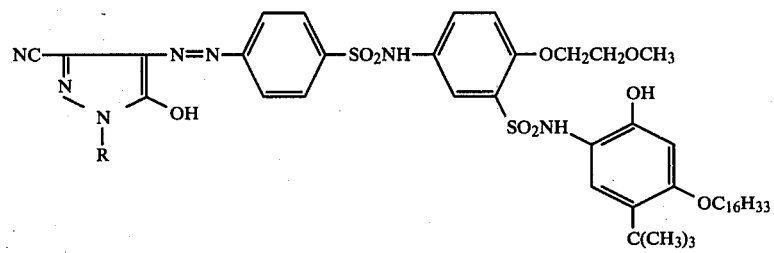

Compound 22
A compound having the formula same as that of Compound 21 except for R is $C_2H_5$.

Compound 23
A compound having the formula same as that of Compound 21 except for R is n—$C_3H_7$.

Compound 24

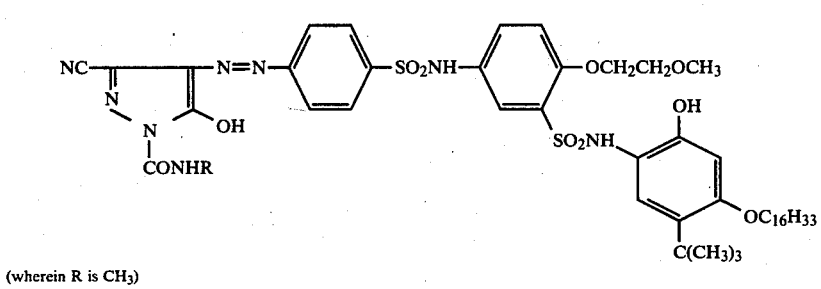

(wherein R is $CH_3$)

Compound 25

A compound having the formula same as that of Compound 24 except for R is $C_2H_5$.

Compound 26

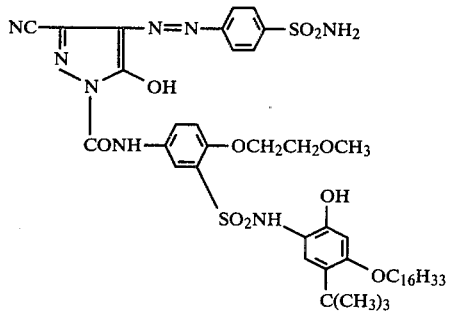

Of the above examples of the compounds according to the present invention, Compounds 1, 5, 6, 10 and 21 are particularly preferred.

Typical synthesis examples of DRR compounds used in the present invention and the intermediates thereof are explained in detail below.

SYNTHESIS OF COMPOUND 1

(1) (Synthesis of 3-cyano-1-(2-cyanoethyl)-5-pyrazolone 13.5 g of 3-carbamoyl-1-(2-cyanoethyl)-5-pyrazolone and 120 ml of acetonitrile were put into a 200 ml 3-neck flask. A mixture solution of 27 ml of phosphorus oxychloride and 76 ml of N,N-dimethylformamide was added dropwise at a temperature below 15° C. After completion of the addition, the reaction mixture was poured into ice water and extracted with ethyl acetate. The extract was concentrated and the crystals (white color) formed were collected by filtration. Yield: 7.8 g (64.2%), Melting Point: 162° to 164° C.

(2) Synthesis of 3-cyano-1-(2-cyanoethyl)-4-(4-sylfophenylazo)-5-pyrazolone 5.2 g of sulfanilic acid was placed in a 50 ml Erlenmeyer flask to which was added 10 ml of an aqueous solution containing 1.2 g of sodium hydroxide and 15 ml of an aqueous solution containing 2.1 g of sodium nitrite which was completely dissolved. The solution was added dropwise to 40 ml of ice water containing 9.6 ml of 35% hydrochloric acid while maintaining the temperature below 5° C. After the completion of the addition, the mixture was stirred for 30 minutes [preparation of diazo solution].

Separately, 4.9 g of 3-cyano-1-(2-cyanoethyl)-5-pyrazolone synthesized in step (1) above, 30 ml of methyl alcohol and 20 ml of an aqueous solution containing 10 g of sodium acetate were put into a 200 ml 3-neck flask. The diazo solution prepared in the above manner was added dropwise to the mixture at a temperature below 10° C. After completion of the addition, the mixture was stirred for 1 hour and the crystals (yellow color) formed were collected by filtration. Yield: 8.7 g (79.1%), Melting Point: above 200° C.

(3) Synthesis of 3-cyano-1-(2-cyanoethyl)-4-(4-chlorosulfonylphenylazo)-5-pyrazolone 8.7 g of the pyrazolone compound obtained in step (2) above, 45 ml of acetonitrile and 9 ml of N,N-dimethylacetamide were put into a 100 ml 3-neck flask and 9 ml of phosphorus oxychloride was added dropwise to the mixture at a temperature below 40° C. After completion of the addition, the mixture was stirred for 30 minutes and then poured into water containing ice. The crystals (yellow color) formed were collected by filtration. Yield: 6.8 g (79.1%), Melting Point: 178° to 180° C.

(4) Synthesis of Compound 1

6.34 g of 2-[2'-(2-methoxyethoxy)-5'-aminobenzenesulfonamido]-4-tert-butyl-5-hexadecyloxy-1-phenol, 3.6 g of the pyrazolone compound obtained in step (3) above and 20 ml of N,N-dimethylacetamide were put into a 100 ml 3-neck flask and 2.4 ml of pyridine was added to the mixture. After stirring for 1 hour at room temperature, the reaction solution was poured into an aqueous hydrochloric acid. The crystals (yellow color) formed were collected by filtration and recrystallized from a solvent mixture of ethyl acetate and methyl alcohol (1:1 in value ratio). Yield: 8.7 g (90%), Melting Point: 163° to 165° C., molar extinction coefficient $\epsilon_{432}^{aceton}$: $2.28 \times 10^4$.

Other compounds according to the present invention can be easily synthesized in a manner similar to that described above with reference to U.S. Pat. Nos. 4,013,632, 3,309,199, 3,227,550.

The silver halide emulsion used in the present invention is a hydrophilic colloidal dispersion of silver chloride, silver bromide, silver chlorobromide, silver iodobromide, silver chloroiodobromide or a mixture thereof. The halogen composition of the silver halide is selected depending on the purpose for which the light-sensitive material is used and the processing conditions of the light-sensitive material. However, it is particularly preferred to use a silver bromide emulsion, a silver iodobromide emulsion or a silver chloroiodobromide emulsion wherein the iodide content is 10 mol% or less and the chloride content is 30 mol% or less.

In the present invention, it is possible to use not only a surface latent image type negative emulsion but also a direct reversal type emulsion. As the latter type emulsion, there are an internal latent image type emulsion and a fogged direct reversal type emulsion.

The internal latent image type silver halide emulsion advantageously used in the present invention include a conversion type silver halide emulsion, a core/shell type silver halide emulsion, a silver halide emulsion containing a different kind of metal and the like as described in U.S. Pat. Nos. 2,592,250, 3,206,313, 3,447,927, 3,761,276, 3,935,014.

This type of silver halide emulsion is suitable to obtain a direct positive image upon development processing, after exposure, in the presence of a nucleating agent. Typical nucleating agents include hydrazines as described in U.S. Pat. Nos. 2,588,982 and 2,563,785; hydrazides and hydrazones as described in U.S. Pat. No. 3,227,552; quaternary salt compounds as described in British Pat. No. 1,283,835, Japanese Patent Publication No. 38164/74, U.S. Pat. Nos. 3,734,738, 3,719,494 and 3,615,615; sensitizing dyes having a nucleating substituent in the dye molecule as described in U.S. Pat. No. 3,718,470; and acylhydrazinophenylthiourea compounds as described in U.S. Pat. Nos. 4,030,925 and 4,031,127.

The silver halide emulsion used in the present invention can be modified to have an enlarged color sensitivity by the action of a spectral sensitizing dye. Useful spectral sensitizing dyes include a cyanine dye and a merocyanine dye.

The present invention will now be explained with reference to DRR compounds. However, the invention can be applied to other dye image-providing compounds.

The coating amount of the DRR compound is $1 \times 10^{-4}$ to $1 \times 10^{-2}$ mol/m$^2$, preferably $2 \times 10^{-4}$ to $2 \times 10^{-3}$ mol/m$^2$.

The DRR compound used in the present invention can be dispersed in a hydrophilic colloid carrier by various methods depending on the type of the compound. For example, a compound having a dissociative group such as a sulfo group or a carboxy group can be dispersed in a hydrophilic colloid solution as a solution in water or an alkaline aqueous solution. On the other hand, a compound, which is sparingly soluble in an aqueous medium but easily soluble in an organic solvent, can be dispersed in the following manner:

(1) The compound is dissolved in a substantially water-insoluble high-boiling solvent and then the solution formed is dispersed in a hydrophilic colloid solution. Such a method is described in, for example, U.S. Pat. Nos. 2,322,027, 2,535,514 and 2,801,171. Also, a low-boiling solvent or an organic solvent readily soluble in water may be used in the aforesaid method and such a solvent is removed by volatilization under drying or by washing with water.

(2) The compound is dissolved in a water-miscible solvent. The solution is then dispersed in a hydrophilic colloid solution.

(3) In method (1) described above, an oleophilic polymer may be used instead of or in combination with the high-boiling solvent. Such a method is described in, for example, U.S. Pat. No. 3,619,195 and German Patent Publication No. 1,957,467.

(4) The compound is dissolved in a water-miscible solvent and to the solution is gradually added an aqueous latex to provide a dispersion wherein the compound is incorporated in the latex particles. This method is described in, for example, U.S. Pat. Nos. 4,203,716, 4,214,047 and 4,199,363.

Moreover, a hydrosol of an oleophilic polymer described, for example, in Japanese Patent Publication No. 39835/76 may be added to the hydrophilic colloid dispersion obtained by the above-described method.

Dispersion of the DRR compound is greatly promoted by using a surface active agent as an emulsifying aid. Examples of the useful surface active agents are described in, for example, the above-mentioned patent specifications and Japanese Patent Publication No. 4923/64 and U.S. Pat. No. 3,676,141.

Examples of the hydrophilic colloids useful for dispersing the DRR compounds include, for example, gelatin, colloidal albumin, casein, a cellulose derivative such as carboxymethyl cellulose, hydroxyethyl cellulose, etc., a saccharide derivative such as agar-agar, sodium alginate, a starch derivative, etc., and a synthetic hydrophilic colloid such as polyvinyl alcohol, poly-N-vinyl pyrrolidone, polyacrylic acid copolymer, polyacrylamide, and a derivative thereof (for example, a partially hydrolyzed product). These colloids may be used in various combinations as a miscible mixture.

Among the aforesaid materials, gelatin is most generally used and gelatin may be partially or wholly replaced with a synthetic hydrophilic colloid.

In the above-described process any silver halide developing agent which can cross-oxidize the DRR compound can be used. Such a developing agent may be incorporated in an alkaline processing composition or in an appropriate layer of a photographic element. Examples of the developing agents used in the present invention include hydroquinones, aminophenols, phenylenediamines, pyrazolidinones (for example, Phenidone(1-phenyl-3-pyrazolidinone), Dimeson(1-phenyl-4,4-dimethyl-3-pyrazolidinone), 1-p-tolyl-4-methyl-4-oxymethyl-3-pyrazolidinone, 1-(4'-methoxyphenyl)-4-methyl-4-oxymethyl-3-pyrazolidinone, 1-phenyl-4-methyl-4-oxymethyl-3-pyrazolidinone), and the like as described in Japanese Patent Application (OPI) No. 16131/81.

Of these developing agents, generally black-and-white developing agents (in particular, pyrazolidinones) which are capable of reducing the formation of stains in an image-receiving layer are particularly preferred in comparison with color developing agents such as phenylenediamines.

The processing composition used in the present invention contains a base such as sodium hydroxide, potassium hydroxide, sodium carbonate, or sodium phosphate, and has a pH higher than 9, preferably higher than 11.5. The processing composition may contain an antioxidant such as sodium sulfite, an ascorbic acid salt, or a piperidinohexose reductone and may contain a silver ion concentration controlling agent such as potassium bromide. The processing composition may further contain a viscosity increasing compound such as hydroxyethyl cellulose, or sodium carboxymethyl cellulose.

The alkaline processing composition used in the present invention may also contain a development accelerating compound or a compound for accelerating the diffusion of dyes (for example, benzyl alcohol, etc.).

The photographic light-sensitive material of the present invention comprises a combination of a silver halide emulsion and a dye image-forming compound. For the reproduction of natural color by a subtractive color process, the light-sensitive material has at least two combinations of a silver halide emulsion having a selective spectral sensitivity in a certain wavelength region and a dye image-forming compound having a selective spectral absorption in the same wavelength region. In particular, a light-sensitive material comprising a combination of a blue-sensitive silver halide emulsion and a yellow DRR compound, a combination of a green-sensitive silver halide emulsion and a magenta DRR compound, and a combination of a red-sensitive silver halide emulsion and a cyan DRR compound is useful. The color photographic light-sensitive material of the present invention also includes a light-sensitive material which provides black color by a combination of a yellow dye with a magenta dye and a cyan dye, etc. Therefore, the light-sensitive material of the present invention may be applied to X-ray photography in which black color formation is employed.

The light-sensitive material of the present invention can be used not only for a color diffusion transfer process but also for a color paper or a color film in which a color image is formed by a conventional processing. These combination units of the silver halide emulsions and the DRR compounds may be coated as a laminated layer in a face-to-face relationship in the light-sensitive element or may be coated as one layer of a mixture of the particles (a DRR compound and a silver halide grain existing in the same particle).

Between an interlayer and a layer containing the dye image-providing material, a spacing layer as described in Japanese Patent Application (OPI) No. 52056/80 may be provided.

A mordanting layer, a neutralizing layer, a neutralization speed controlling layer (timing layer), and a processing composition used for the light-sensitive material of the present invention are described in Japanese Patent Application (OPI) No. 64533/77.

The light-sensitive material of the present invention is preferably a mono-sheet type film unit throughout before, during and after the image-exposure thereof (that is, a combination of a light-sensitive element, and image-receiving element, and a processing element) which can be developed in a bright place. Such film units are described in *Photographic Science and Engineering*, described above, Nebletts's *Handbook of Photography and Reprography Materials, Process and Systems*, 7th Ed., Chapter 12 (1977), and the like.

The present invention will be explained in more detail with reference to the following examples.

EXAMPLE 1

On a transparent polyester support, there were coated, in order, the following layers to prepare laminated type multicolor light-sensitive materials. The coating amount is shown in parentheses "()" using a unit of g/m² unless otherwise indicated.

(1) Layer containing poly(N-vinylbenzyl-N-benzyl-N,N-dimethyl ammonium chloride) (3.0) as a mordant and gelatin (3.0).

(2) Layer containing titanium dioxide (16.0) and gelatin (2.29).

(3) Layer containing carbon black (2.70) and gelatin (2.70).

(4) Layer containing a cyan DRR compound having the formula below (0.41), tricyclohexyl phosphate (0.07) and gelatin (0.54).

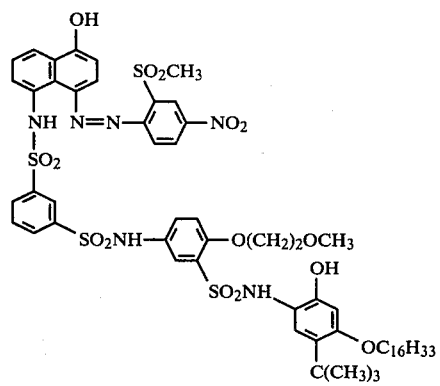

(5) Layer containing a red-sensitive internal latent image type direct reversal silver bromide emulsion (silver: 1.03, gelatin: 1.2), a nucleating agent having the formula below (0.26 g per mol of silver) and sodium pentadecyl hydroquinone sulfonate (0.13).

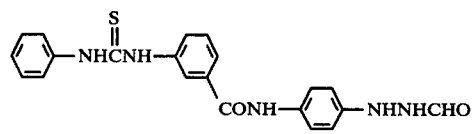

(6) Layer containing 2,5-di-tert-pentadecyl hydroquinone (0.76), polyvinyl acetate (0.64) and gelatin (0.76).

(7) Layer containing two magenta DRR compounds M-I (0.25) and M-II (0.13) each having the formula below, tricyclohexyl phosphate (0.08) and gelatin (0.5).

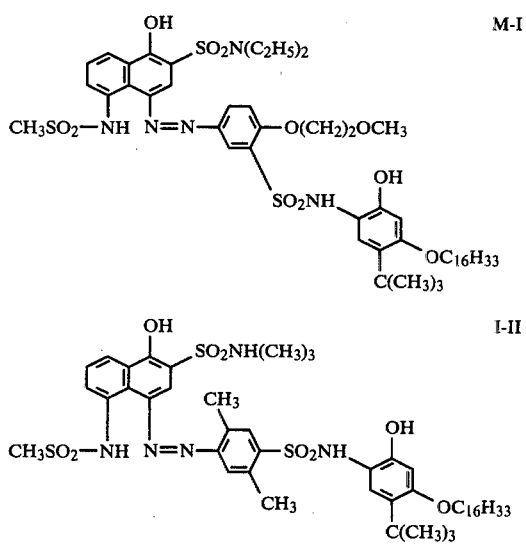

(8) Layer containing a green-sensitive internal latent image type direct reversal silver bromide emulsion (silver: 0.84, gelatin: 0.9), a nucleating agent same as used in Layer (5) (3.72 g per mol of silver) and sodium pentadecyl hydroquinone sulfonate (0.08).

(9) Layer same as Layer (6).

(10) Layer containing a yellow DRR compound 1 or 21 described hereinbefore according to the present invention (0.50 millimol/m²), tricyclohexyl phosphate (0.11) and gelatin (0.44).

(11) Layer containing a blue-sensitive internal latent image type direct reversal silver bromide emulsion (silver: 1.09, gelatin 1.1), a nucleating agent same as used in Layer (5) (5.4 g per mol of silver) and sodium pentadecyl hydroquinone sulfonate (0.07).

(12) Layer containing gelatin (1.0)

A comparative light-sensitive material was coated in the same way as described above except that Compound 1 or Compound 21 in Layer (10) was replaced with Comparison Compound A in which the 1-position of the pyrazolone is substituted by a phenyl group instead of the alkyl group in case of Compound 1 or 21.

Comparison Compound A

-continued

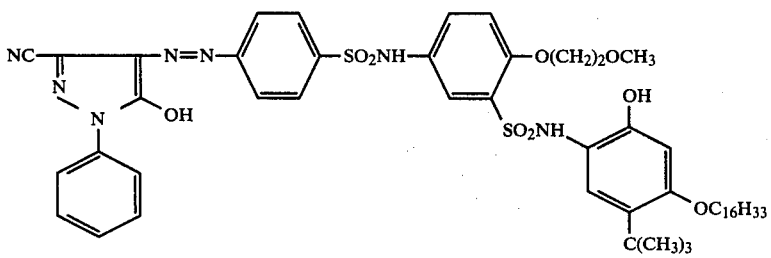

The light-sensitive materials of the present invention and the comparative light-sensitive material prepared as described above were exposed using a continuously density changing type multicolor sensitometer. The exposed light-sensitive material was associated with a container (processing solution pod) containing a processing solution described below and a transparent cover sheet described below to prepare a film unit. The film unit was processed by passing it through a pair of press rollers at 15° C. and 25° C. to spread the processing solution in a thickness of 80 μm and thus a transferred dye image was obtained. As the result of sensitometry, $D_{max}$ and $D_{min}$ of the yellow portion were excellent and the color hue was also excellent.

A processing solution having the composition as illustrated below was charged in an amount of 0.8 g to a rupturable container.

| Composition of Processing Solution | |
|---|---|
| 1-(p-Tolyl)-4-hydroxymethyl-4-methyl-3-pyrazolidinone | 6.9 g |
| Methylhydroquinone | 0.3 g |
| 5-Methylbenzotriazole | 3.5 g |
| Sodium Sulfite (anhydrous) | 2.0 g |
| Carboxymethyl Cellulose Sodium Salt | 58 g |
| Potassium Hydroxide (28% aq. soln.) | 200 cc |
| Benzyl Alcohol | 1.5 ml |
| Carbon Black | 144 g |
| Water | 537 cc |

A cover sheet was prepared by successively coating on a polyethylene terephthalate support the following layers.

(1) A layer containing an acrylic acid-butyl acrylate (molar ratio: 8:2) copolymer (22) and 1,4-bis(2,3-epoxypropoxy)butane (0.44).

(2) A layer containing acetyl cellulose (hydrolysis of 100 g of acetyl cellulose provides 52.1 g of acetic acid) (3.8), a styrene-maleic anhydride (molar ratio: 6:4) copolymer (0.2) and 5-(β-cyanoethylthio)-1-phenyltetrazole (0.115).

(3) A layer containing a styrene-n-butyl acrylateacrylic acid-N-hydroxymethylacrylamide (weight ratio: 50:40:3:7) copolymer (1.8) and a methyl methacrylateacrylic acid-N-hydroxymethylacrylamide (weight ratio: 92:4:4) copolymer (1.2).

A light stability test of the transferred dye image obtained in the film unit was performed using a fluorescent lamp as a light source with a light exposure of 3,000 luxes at 25° C. and 45% relative humidity for 3 weeks. The remaining ratio of yellow dye was determined at the area wherein the initial optical density was 1.0. The remaining ratio of the Compounds 1 and 21 according to the present invention and Comparison Compound A was 92%, 95% and 76%, respectively. This results indicated that the compound according to the present invention is superior to the comparison compound with respect to light fastness.

Furthermore, the transfer speed of the dye released from the yellow DRR compound was compared using film units having the same composition as described above. However, the comparison was carried out in the gray area of the units unexposed to light. After spreading the processing solution, the reflective density of the yellow dye portion fixed in a mordanting layer (image receiving layer) was measured at regular intervals. One hour after spreading, substantially the same yellow maximum density $D^B{}_{max}$ was obtained in both film units. The time necessary to reach a density of 80% of the maximum density $D^B{}_{max}$ was determined from the values obtained by the above measurement. The yellow dye released from the Compound 1 according to the present invention transfers faster by 0.30 minute at 25° C. and by 0.50 minute at 15° C. than the dye released from the Comparison Compound A. Also, the yellow dye released from the Compound 21 according to the present invention transfers faster by 0.32 minute at 25° C. and by 0.55 minute at 15° C. than the dye released from the Comparison Compound A. The yellow dyes reach to the maximum density relatively slower than the magenta or cyan dyes and make a rate-determining step to obtain a gray balance. From these results, it will be apparent to one skilled in the art that the compound according to the present invention has an advantageous property.

EXAMPLE 2

On a transparent polyester support, there were coated, in order, the following layers to prepare light-sensitive materials.

(1) Layer containing a yellow DRR compound 1 or 21 according to the present invention (0.954), tricyclohexyl phosphate (0.16) and gelatin (1.0).

(2) Layer containing a blue-sensitive internal latent image type direct reversal silver bromide emulsion (silver: 2.18, gelatin: 2.2), a nucleating agent as used in Layer (5) in Example 1 (5.4 g per-mol of silver) and sodium pnetadecyl hydroquinone sulfonate (0.14).

(3) Layer containing gelatin (1.1).

A comparative photographic light-sensitive material (B) was prepared in the same manner as described above except that Comparison Yellow DRR Compound (B) described below (1.006) (in which a phenyl group is substituted at the 1-position of the pyrazolone ring) was used in place of the above-described yellow DRR compound according to the present invention.

Comparison DRR Compound (B)

-continued

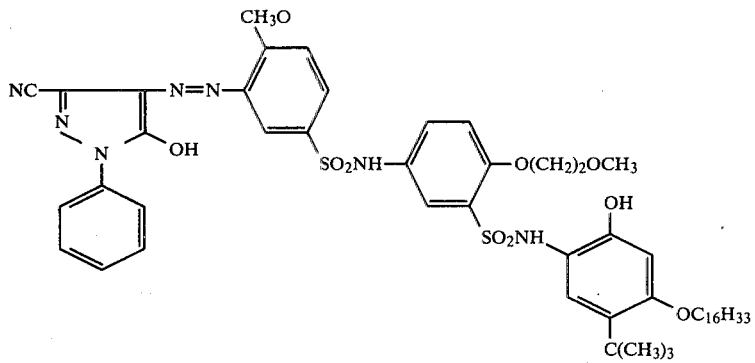

The light-sensitive materials of the present invention and the comparative light-sensitive material (B) were exposed stepwise, and then a processing solution as described in Example 1 was spread between the above sheet and a mordanting sheet described below. The unit was passed through a pair of press rollers to spread the processing solution in a thickness of 80 μm at 25° C. After 5 minutes the mordanting sheet was separated from the light-sensitive material, immersed in a 2% aqueous acetic acid solution, washed with water, stabilized in a McIlvain buffer solution of pH 7 and dried.

The mordanting sheet was prepared by coating a layer containing the mordant (3.0) described below and gelatin (3.0) on a transparent polyester support.

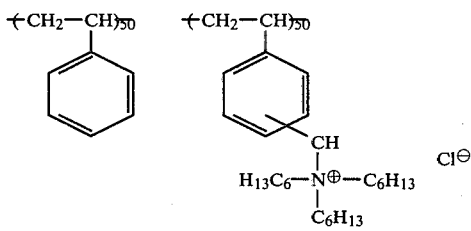

TABLE 1

| Compound | Yellow Maximum Transmission Density | Yellow Minimum Transmission Density | Remarks |
| --- | --- | --- | --- |
| 1 | 2.4 | 0.10 | Invention |
| 21 | 2.35 | 0.11 | Invention |
| (B) | 2.0 | 0.15 | Comparison |

It is apparent from the results shown in Table 1 above that the sample according to the present invention provides the transferred dye image with a high maximum transmission density ($D_{max}$), a low minimum transmission density ($D_{min}$), good gradation and an excellent color hue compared with Comparison Sample (B).

While the invention has been described in detail and with reference to specific embodiments thereof, it will be apparent to one skilled in the art that various changes and modifications can be made therein without departing from the spirit and scope thereof.

What is claimed is:

1. A color photographic light-sensitive material which comprises a support having thereon at least one light-sensitive silver halide emulsion layer having associated therewith a compound represented by the following general formula (I):

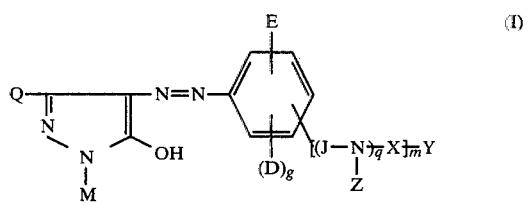

wherein Q represents a cyano group, M is a straight chain or branched chain alkyl group having 1 to 14 carbon atoms or a substituted alkyl group substituted with a cyano group or a sulfamoyl group, E represents a hydrogen atom, a chlorine atom, a bromine atome, a lower alkyl group or a lower alkoxy group, D represents a substituent as defined for E, an alkylsulfonyl group having 1 to 4 carbon atoms or a sulfamoyl group, g represents 0, 1 or 2, m and q each represents 0 or 1, J represents a divalent group selected from a sulfonyl group and a carbonyl group, Z represents a hydrogen atom, an alkyl group or a substituted alkyl group, X represents a divalent bonding group represented by the formula $-A_1-(L)_n-(A_2)_p-$, wherein $A_1$ and $A_2$ are the same or different and each represents an alkylene group or an arylene group, L represents a divalent group selected from an oxy group, a carbonyl group, a carboxyamido group, a carbamoyl group, a sulfonamido group, a sulfamoyl group, a sulfinyl group and a sulfonyl group, and n and p each represents 0 or 1, and Y represents a moiety which provides, as a result of development processing under alkaline conditions, an azo dye compound having a different diffusibility from that of the azo dye image-forming compound of the formula (I), wherein Y is a group represented by one of the following general formulae (A) to (H) and (J):

wherein β represents the non-metallic atoms necessary to complete a benzene ring, to which a carbon ring or a hetero ring may be fused, which may be substituted, α represents an $-OG^1$ or $-NHG^2$ group, wherein $G^1$ represents a hydrogen atom or a group capable of forming a hydroxyl group by hydrolysis, $G^2$ represents a hydrogen atom, an alkyl group having 1 to 22 carbon atoms or a hydrolyzable group, b is an integer of 0, 1 or 2 and Ball represents a ballast group;

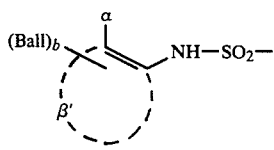 (B)

wherein Ball, $\alpha$ and b are the same as defined in formula (A), and $\beta'$ represents the atoms necessary to form a carbon ring to which a carbon ring or a hetero ring may further be fused, which may be substituted;

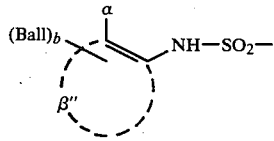 (C)

wherein Ball, $\alpha$ and b are the same as defined in formula (A), and $\beta''$ represents the atoms necessary to form a hetero ring to which a carbon ring or a hetero ring may further be fused, which ring(s) may be substituted;

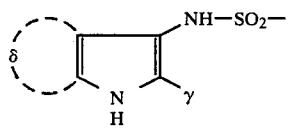 (D)

wherein $\gamma$ represents a hydrogen atom, an alkyl group, an aryl group or a hetero group, which may be unsubstituted or substituted, or $-CO-G^6$ wherein $G^6$ represents $-OG^7$, $-S-G^7$ or

wherein $G^7$ represents a hydrogen atom, an alkyl group, a cycloalkyl group or an aryl group, which may be substituted, $G^8$ represents the same group as $G^7$ or an acyl group derived from an aliphatic or aromatic carboxylic acid or from sulfonic acid, $G^9$ represents a hydrogen atom or a substituted or unsubstituted alkyl group, $\delta$ represents the atoms necessary to complete a fused benzene ring, which ring may have one or more substituents, and $\gamma$ and/or the substituents on said fused benzene ring completed by $\delta$ is a ballast group or a ballast-containing group;

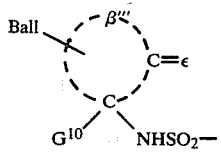 (E)

wherein Ball is the same as defined in formula (A), $\epsilon$ represents an oxygen atom or $=NG''$, wherein $G''$ represents a hydroxyl group or an amino group which may be substituted, $\beta'''$ represents a 5-, 6- or 7-membered saturated or unsaturated non-aromatic hydrocarbon group, and $G^{10}$ represents a hydrogen atom or a halogen atom;

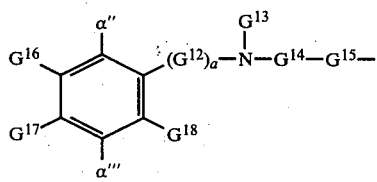 (F)

wherein $\alpha''$ represents an oxidizable nucleophilic group, $\alpha'''$ represents a dialkylamino group or a group as defined for $\alpha''$, $G^{14}$ represents an electrophilic group, $G^{15}$ represents an oxygen atom, a sulfur atom, a selenium atom or a nitrogen atom, and when $G^{15}$ represents a nitrogen atom, it may be substituted by a hydrogen atom, an unsubstituted or substituted alkyl group having 1 to 10 carbon atoms, or an aromatic compound residue having 6 to 20 carbon atoms, $G^{12}$ represents an alkylene group having 1 to 3 carbon atoms, a represents 0 or 1, $G^{13}$ represents a substituted or unsubstituted alkyl group containing 1 to 40 carbon atoms or a substituted or unsubstituted aryl group containing 6 to 40 carbon atoms, $G^{16}$, $G^{17}$ and $G^{18}$ each represents a hydrogen atom, a halogen atom, a carbonyl group, a sulfamyl group, a sulfonamido group, an alkoxy group containing 1 to 40 carbon atoms, or may be the same as defined for $G^{13}$ or, when taken together $G^{16}$ and $G^{17}$ may form a 5- to 7-membered ring, further wherein $G^{17}$ may be

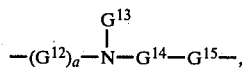

provided that at least one of $G^{13}$, $G^{16}$, $G^{17}$ and $G^{18}$ represents a ballast group;

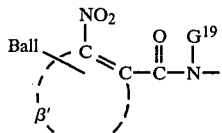 (G)

wherein Ball and $\beta'$ are the same as defined in formula (B), and $G^{19}$ represents an alkyl group which may be substituted;

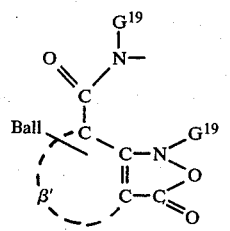 (H)

wherein Ball and $\beta'$ are the same as defined in formula (B), and $G^{19}$ is the same as defined in formula (G);

(Ball-Coup)$_r$-Link- (J)

wherein Coup represents a coupler residue capable of coupling with an oxidation product of a color developing agent, Ball represents a ballast group, Link represents a group bonded to an active site of Coup, which bond with Coup will be split upon coupling reaction between the dye image-forming compound represented by formula (I) containing the group represented by formula (J) as Y and an oxidation product of a color developing agent, and t represents 1 or 2 when Link represents an alkylidene group or represents 1 when Link represents another group as described above.

2. A color photographic light-sensitive material as claimed in claim 1, which comprises a support having thereon a combination of a blue-sensitive silver halide emulsion and a yellow DRR compound represented by the formula (I), a combination of a green-sensitive silver halide emulsion and a magenta DRR compound, and a combination of a red-sensitive silver halide emulsion and a cyan DRR compound.

3. The color photographic light-sensitive material as claimed in claim 1, wherein M is said alkyl group having 1 to 14 carbon atoms.

4. The color photographic light-sensitive material as claimed in claim 1, wherein M is said substituted alkyl group having 1 to 14 carbon atoms in the alkyl moiety and the substituent being selected from a cyano group and a sulfamoyl group.

5. The color photographic light-sensitive material as claimed in claim 1, wherein E is an alkyl group having 1 to 4 carbon atoms.

6. The color photographic light-sensitive material as claimed in claim 1, wherein said compound represented by the general formula (I) is a dye releasing redox compound.

7. The color photographic light-sensitive material as claimed in claim 1, wherein said compound represented by the general formula (I) is a dye releasing coupler.

8. The color photographic light-sensitive material as claimed in claim 1, wherein Y is a group represented by the following general formula (A):

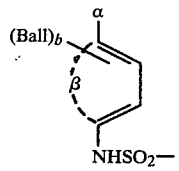

(A)

wherein $\beta$ represents non-metallic atoms necessary to complete a benzene ring; $\alpha$ represents an $-OG^1$ or $-NHG^2$ group wherein $G^1$ represents a hydrogen atom or a group capable of forming a hydroxy group by hydrolysis and $G^2$ represents a hydrogen atom, an alkyl group having 1 to 22 carbon atoms or a hydrolyzable group; b is 0, 1 or 2; and Ball represents a ballast group.

9. The color photographic light-sensitive material as claimed in claim 1, wherein Y is a group represented by the following general formula (B):

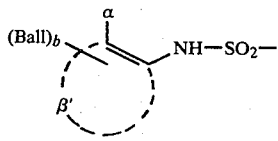

(B)

wherein $\beta'$ represents atoms necessary to form a carbon ring; $\alpha$ represents an $-OG^1$ or $-NHG^2$ group wherein $G^1$ represents a hydrogen atom or a group capable of forming a hydroxy group by hydrolysis and $G^2$ represents a hydrogen atom, an alkyl group having 1 to 22 carbon atoms or a hydrolyzable group; b is 0, 1 or 2; and Ball represents a ballast group.

10. The color photographic light-sensitive material as claimed in claim 1, wherein Y is a group represented by the following general formula (C):

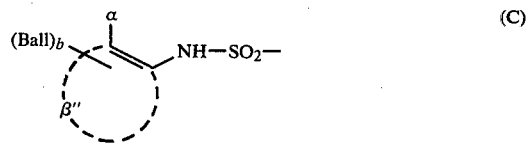

(C)

wherein $\beta''$ represents atoms necessary to form a hetero ring; $\alpha$ represents an $-OG^1$ or $-NHG^2$ group wherein $G^1$ represents a hydrogen atom or a group capable of forming a hydroxy group by hydrolysis and $G^2$ represents a hydrogen atom, an alkyl group having 1 to 22 carbon atoms or a hydrolyzable group; b is 0, 1 or 2; and Ball represents a ballast group.

11. The color photographic light-sensitive material as claimed in claim 1, wherein Y is a group represented by the following general formula (D):

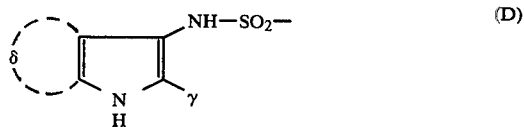

(D)

wherein $\gamma$ represents a hydrogen atom, and alkyl group, an aryl group, a hetero ring group or $-CO-G^6$ wherein $G^6$ represents $-OG^7$, $-S-G^7$ or

(wherein $G^7$ represents a hydrogen atom, an alkyl group, a cycloalkyl group or an aryl group, $G^8$ represents the same group as $G^7$ or an acyl group, and $G^9$ represents a hydrogen atom or an alkyl group); and $\delta$ represents atoms necessary to form a fused benzene ring.

12. The color photographic light-sensitive material as claimed in claim 1, wherein Y is a group represented by the general formula (A) wherein Ball is a di(long chain alkyl group)substituted carbamoyl group.

13. The color photographic light-sensitive material as claimed in claim 1, wherein Y is a group represented by the following general formula

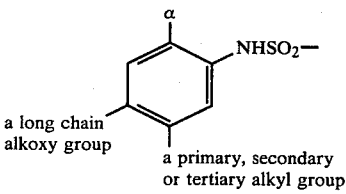

wherein $\alpha$ represents an $-OG^1$ or $-NHG^2$ group wherein $G^1$ represents a hydrogen atom or a group capable of forming a hydroxy group by hydrolysis and $G^2$ represents a hydrogen atom, an alkyl group having 1 to 22 carbon atoms or a hydrolyzable group.

14. The color photographic light-sensitive material as claimed in claim 1, wherein Y is a group represented by the general formula (D) wherein $\delta$ is $-COG^6$.

15. The color photographic light-sensitive material as claimed in claim 1, wherein said silver halide emulsion is an internal latent image type direct reversal emulsion.

* * * * *